Aug. 24, 1954

W. F. RICHMOND, JR 2,687,474

INTEGRATOR

Filed Feb. 14, 1952

INVENTOR
WILLIAM FRANK RICHMOND, JR.
BY
ATTORNEY

Patented Aug. 24, 1954

2,687,474

UNITED STATES PATENT OFFICE 2,687,474

INTEGRATOR

William Frank Richmond, Jr., Towson, Md., assignor to The Glenn L. Martin Company, Middle River, Md., a corporation of Maryland Application February 14, 1952, Serial No. 271,617

7 Claims. (Cl. 250—27)

The invention relates to an electrical integrating circuit, and more particularly to such a circuit which will compute the integral of a given input potential, giving the result as an output potential the value of which is proportional to the integral of the input.

It is a well known characteristic of electrical circuits that the voltage appearing across a capacitor connected in series with a resistor across a source of potential, is proportional to the integral of the voltage across the resistor, so that if the voltage across the resistor constitutes a large part of the input, the voltage across the capacitor will give a fair approximation of the integral of the input. The utility of such an arrangement is limited, however, since in a simple series circuit, the respective voltages across the elements vary continuously with respect to the input during the transient period. To eliminate the inaccuracies inherent in such a system, it would be desirable to devise a circuit in which the voltage across one of the elements could be maintained at a value proportional to the input at all times during the transient period, the voltage across the other element therefore representing the integral of the input voltage multiplied by a proportionality factor.

It is the object of this invention, therefore, to provide a circuit which will produce a voltage whose value is accurately proportional to the exact integral of the input voltage by maintaining the voltage across one of the circuit elements at a value continuously proportional to the input.

Further objects of the invention will become apparent from the following description taken in connection with the accompanying drawings.

Figure 1:
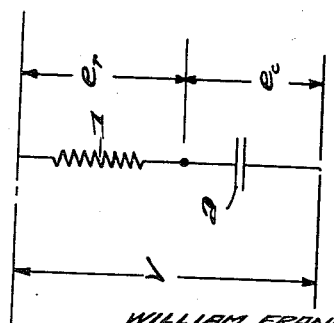
Fig. 1 is a diagram of a series circuit containing a resistor and a capacitor for the purpose of illustrating the principle of operation of a simple integrating circuit.

To illustrate the basic principle underlying the operation of a simple electrical integrator, there is shown in Fig. 1 a series circuit consisting of a resistor $1$ and a capacitor $2$ connected across an input potential V. During the transient period the voltage $e_c$ appearing across the capacitor $2$ will be proportional to the exact integral of the voltage $e_r$ across the resistor $1$. This relationship may be shown as follows:

$$e_c = 1/C \int i \, dt$$
$$i = e_r/R$$
$$\therefore e_c = 1/RC \int e_r \, dt$$

where:

R is the value of the resistor $1$, C the value of the capacitor $2$, and $$\frac{1}{RC}$$

the proportionality factor.

In a practical application of the above described circuit, it will ordinarily be desired to obtain the integral of the input voltage V instead of the integral of the voltage $e_r$. If, as previously mentioned, the values of R and C are chosen so that the voltage $e_c$ is never more than a relatively small percentage of the input voltage throughout the desired integrating period, a reasonably close approximation of the true integral of the input voltage V may be obtained, since the voltage $e_c$ across the condenser is proportional to the integral of the difference between the input voltage V and the voltage $e_c$. However, since the voltage $e_c$ will continuously increase as long as the input voltage is applied to the circuit, thereby increasing the error between the value of the voltage across the condenser and the true integral of the input voltage, the length of the integrating period will be necessarily very restricted. Such an arrangement is quite unsatisfactory where accurate integration over a relatively long time period is required.

Figure 2:
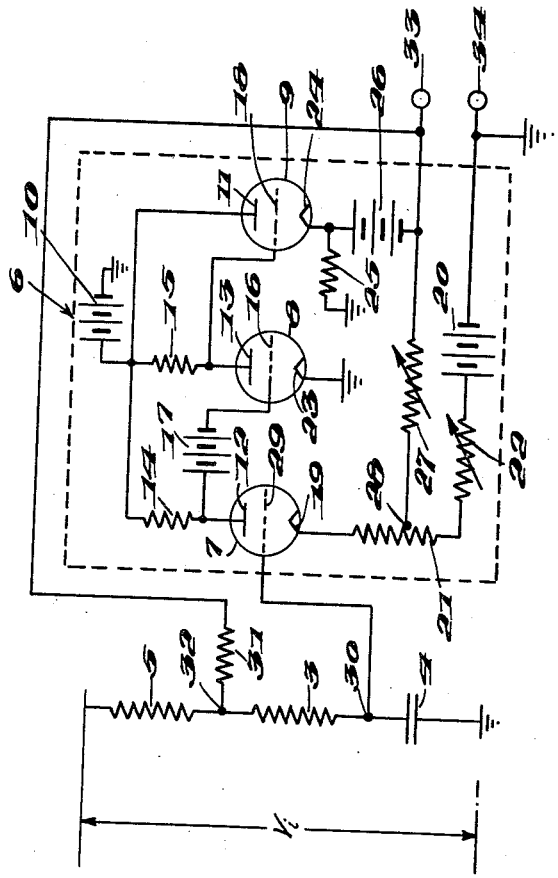
Fig. 2 is a diagram of the integrating circuit comtemplated by this invention showing the details of a simple amplifier suitable for use therein.

One embodiment of the integrating circuit proposed by the applicant to overcome the above mentioned deficiencies is shown in Fig. 2. Resistor 3 and capacitor 4, which compose the computing elements of the circuit, are connected in series with resistor 5 across a source of input potential $V_i$ as shown. A direct current voltage amplifier, indicated generally at 6, comprises a series of three vacuum tubes 7, 8 and 9, a common source of plate voltage, illustrated as a battery 10, being connected to plate 11 of tube 9 and to the plates 12 and 13 of tubes 7 and 8 through resistors 14 and 15 respectively. Plate 12 of tube 7 is connected to grid 16 of tube 8 through battery 17, plate 13 of tube 8 being directly connected to grid 18 of tube 9. Cathode bias for tube 7 is provided as by a battery 20, to which cathode 19 is connected through resistors 21 and 22, resistor 22 being variable to allow adjustment of the bias to the desired value. Cathode 23 of tube 8 is connected directly to ground, while cathode 24 of tube 9 is connected to ground through resistor 25 so as to act as a cathode follower.

As will later be explained the potential at cathode 24 follows variations of the potential across the integrating condenser 4 and serves therefore as a convenient point from which to pick off the desired output voltage (which will be proportional to the integral of the input voltage). To this end output terminals 33 and 34 are provided, terminal 33 being connected to cathode 24 through a battery 26, and terminal 34 being grounded. Battery 26 is of such value as to reduce the voltage at 33 to ground potential when there is no voltage across integrating condenser 4 and is necessary since, in the arrangement shown, tube 9 will draw some plate current even under zero input conditions.

To obtain stability in the performance of the amplifier, the circuit is made highly degenerative by means of a negative feed back circuit comprising a variable resistor 27 connected between output terminal 33 and an intermediate point 28 on resistor 21. The amount of feed back, and therefore the overall gain of the amplifier, may be varied by adjusting resistor 27 to give the desired gain. In practice an over-all gain of two has been found quite satisfactory.

The grid 29 of tube 7 is connected to the junction 30 between resistor 3 and capacitor 4, any increase in the voltage across capacitor 4 causing an increase in the potential of the grid 29, thereby increasing the plate current flowing through tube 7 with a consequent decrease in potential at plate 12. The reduced potential at plate 12 results in a corresponding decrease in potential at grid 16 of tube 8, reducing the value of plate current flowing through that tube, and raising the potential of plate 13. This increased potential appears at grid 18 of tube 9, increasing the plate current through that tube and thereby raising the potential of cathode 24 by an amount proportional to the change in potential across the intergrating capacitor 4.

As so far described, the output voltage of amplifier 6 would be proportional to the integral of the voltage drop across resistors 3 and 5 in series. However, by connecting a suitable resistor 31 between the output terminal 33 and the junction 32 of resistors 3 and 5, so that resistors 5 and 31 constitute a divider network, the potential at point 32 can be caused to increase at the same rate and to the same extent as the voltage across condenser 4 increases. Under these conditions the voltage across resistor 3 will be maintained directly proportional to the input voltage $V_i$, and since the voltage $e_c$ across the condenser 4 is always proportional to the true integral of the voltage across resistor 3, it will likewise be directly proportional to the true integral of the input voltage. To attain this result, resistor 31 must have a value equal to $(K-1)$ times the value of resistor 5, where K is the gain of the amplifier 6. The exact values of resistors 5 and 6 will of course depend upon the size of condenser 4 and resistor 3 and the maximum time of integration that is required of the unit.

To more clearly illustrate its operation, the amplifier circuit shown in Fig. 2 has been simplified by showing batteries for the plate supply and cathode bias and in other portions of the circuit. Obviously, the use of such batteries may be eliminated by the utilization of a power supply source and suitable circuit revisions. It will be apparent that any suitable amplifier may be substituted for the one shown, the specific details of amplifier construction not being essential to the principle of operation of the computing circuit.

It should be understood that the invention herein described is not confined to the precise details of construction set forth, as it is apparent that many changes and variations may be made without departing from the scope of the invention, and no limitation is intended by the phraseology of the foregoing description or the illustrations in the accompanying drawings.

I claim as my invention:

1. An electrical integrating circuit comprising a first resistor, a second resistor, and a capacitor connected in series in that order, means connecting said series circuit to a source of input potential, an electronic amplifier responsive to the voltage drop across said capacitor and adapted to produce a voltage directly proportional to the voltage drop across said capacitor, a third resistor providing a direct current path directly connecting the output of said amplifier to the junction between said first and said second resistors, the values of said first and third resistors being such that the voltage drop across said second resistor is directly proportional to said input potential regardless of variations thereof.

2. An electrical integrating circuit comprising a source of input potential, a first and a second resistor and a capacitor connected in series across said source of input potential, an electronic direct current amplifier responsive to the voltage across said capacitor and adapted to produce an output voltage the value of which is equal to the voltage across said capacitor multiplied by a chosen factor, a third resistor providing a direct current path directly connecting the output of said amplifier to the junction between said first and said second resistors, the values of said first and said third resistors being such that the potential produced by said amplifier is divided by said chosen factor, whereby the potential across said second resistor is maintained at a value proportional to said input potential regardless of variations thereof.

3. An electrical integrating circuit comprising a source of input potential, a first and a second resistor and a capacitor connected in series across said source of input potential, a direct current amplifier comprising a series of cascaded vacuum tubes, means electrically connecting the grid of the first of said tubes to the junction between said second resistor and said capacitor, means electrically connecting the anode of each of said tubes to a source of positive potential independent of said source of input potential, means electrically connecting the cathode of one of said tubes to a source of variable negative potential whereby the output potential of said amplifier may be adjusted to be zero when said input potential is zero, and resistor means providing a direct current path directly connecting the output of said amplifier to the junction between said first and said second resistors whereby the potential drop across said second resistor is maintained proportional to said input potential regardless of variations thereof, thereby maintaining the output potential of said amplifier proportional to the integral of said input potential.

4. An integrating circuit having an input and an output, means forming a direct current path between one side of said input and one side of said output and comprising a first resistor connected directly to said one side of said input and a second resistor connected directly between said one side of said output and said first resistor, the other side of said input and said output being directly connected together; a circuit including a condenser connected from the junction between said resistors and to said other side of said input whereby said condenser will be charged in accordance with the voltage at said junction, and an amplifier connected between said condenser and said output and responsive to the voltage across said condenser to produce a proportional voltage across said output, the value of said second resistor being substantially $(K-1)$ times that of said first resistor, where K equals the voltage gain of said amplifier.

5. An integrating circuit having an input and an output, means forming a direct current path between one side of said input and one side of said output and comprising a first resistor connected directly to said one side of said input and a second resistor connected directly between said one side of said output and said first resistor, the other side of said input and said output being directly connected together; a circuit including a condenser connected from the junction between said resistors and to said other side of said input whereby said condenser will be charged in accordance with the voltage at said junction, and an amplifier connected between said condenser and said output and responsive to the voltage across said condenser to produce a proportional voltage across said output, the values of said resistors being so related to one another and to the gain of said amplifier as to maintain the current flow into said condenser at all times directly proportional to the voltage applied across said input.

6. An integrating circuit having an input and an output, means forming a direct current path between one side of said input and one side of said output and comprising a first resistor connected directly to said one side of said input and a second resistor connected directly between said one side of said output and said first resistor, the other side of said input and said output being directly connected together; a third resistor and a condenser connected in series between the junction between said first and second resistors and said other side of said input whereby said condenser will be charged in accordance with the voltage at said junction, and an amplifier connected between said condenser and said output and responsive to the voltage across said condenser to produce a proportional voltage across said output, the values of said resistors being so related to one another and to the gain of said amplifier as to maintain the current flow into said condenser at all times directly proportional to the voltage applied across said input.

7. An electrical integrator having an input and comprising a resistor and a condenser connected in a series circuit across said input, an amplifier responsive to the voltage drop across said condenser and adapted to produce an output voltage directly proportional to said voltage drop, a second resistor providing a direct current path directly connecting the output of said amplifier to said series circuit between said first mentioned resistor and said condenser, the values of said resistors being so related to one another and to the gain of said amplifier as to maintain the current flow into said condenser at all times directly proportional to the voltage applied across said input.

References Cited in the file of this patent

UNITED STATES PATENTS

| Number | Name | Date |
| --- | --- | --- |
| 2,251,973 | Beale et al. | Aug. 12, 1941 |
| 2,324,797 | Norton | July 20, 1943 |
| 2,426,256 | Zenor | Aug. 26, 1947 |
| 2,439,324 | Walker | Apr. 6, 1948 |